United States Patent [19]
Adams

[11] 3,844,610
[45] Oct. 29, 1974

[54] MOTORCYCLE SOLO SEAT

[76] Inventor: Gregory J. Adams, 47 D St., Chula Vista, Calif. 92010

[22] Filed: Sept. 7, 1973

[21] Appl. No.: 395,062

[52] U.S. Cl. .................................. 297/213, 297/214
[51] Int. Cl. ............................................. B62j 1/02
[58] Field of Search .......... 297/195, 196, 213, 214, 297/302, 304, 294, 295

[56] References Cited
UNITED STATES PATENTS

| 467,725 | 1/1892 | Latta.................................... 297/213 |
| 477,122 | 6/1892 | Johnson.......................... 297/213 X |
| 485,186 | 11/1892 | Garford .............................. 297/213 |
| 487,081 | 11/1892 | Staples................................. 297/213 |
| 3,249,384 | 5/1966 | Timms................................ 297/195 |
| 3,258,290 | 6/1966 | Karbin................................ 297/195 |
| 3,708,201 | 1/1973 | Lamkemeyer....................... 297/195 |

*Primary Examiner*—James T. McCall
*Attorney, Agent, or Firm*—Brown and Martin

[57] ABSTRACT

A motorcycle seat having a unitary, contoured, seat-shaped shell with thick, resilient foam material fixed thereto, which shell is mounted on one leg of a spiral spring member having a pair of legs, with the other leg secured in abutting relationship to a seat supporting plate. The seat shell is adjustable relative to one of the legs to provide selective variation in the resilient support of the seat, with the other leg being selectively adjustable relative to the seat supporting plate to selectively adjust the position of the seat relative to the longitudinal length of the motorcycle.

3 Claims, 5 Drawing Figures

PATENTED OCT 29 1974 3,844,610
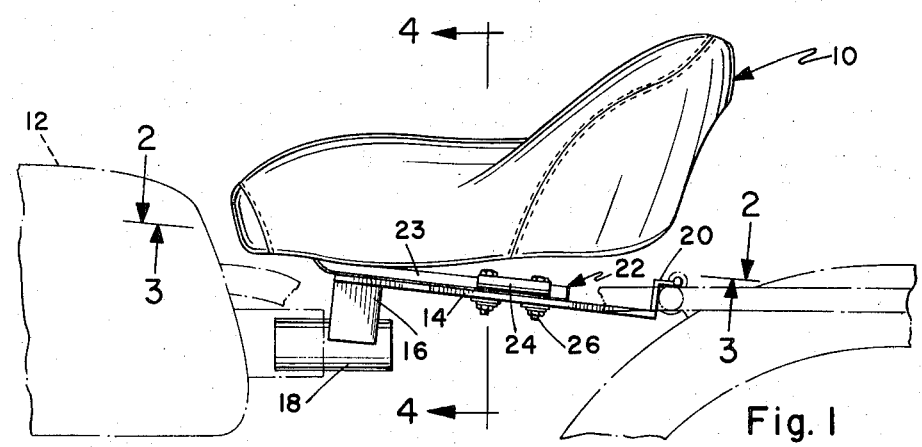
Fig. 1
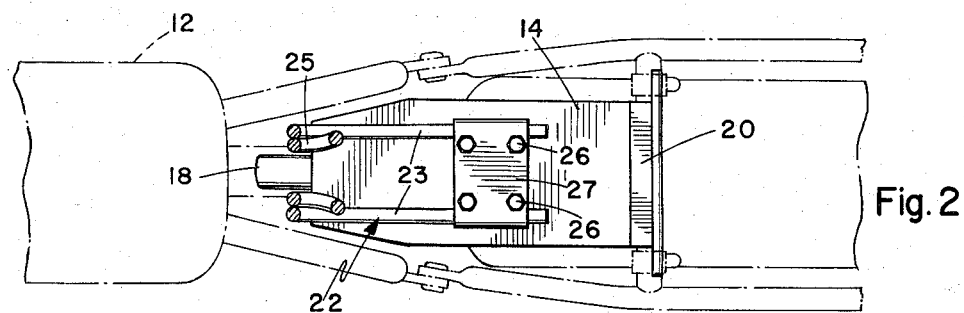
Fig. 2
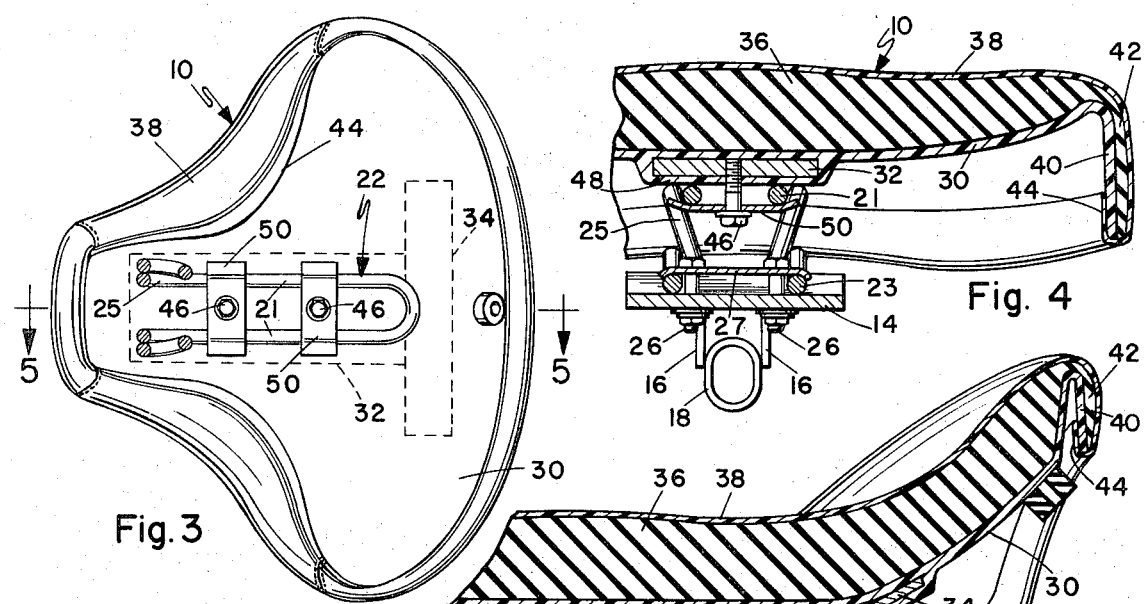
Fig. 3
Fig. 4
Fig. 5

MOTORCYCLE SOLO SEAT

BACKGROUND OF THE INVENTION

There are many types of motorcycle seats. Most of these known seats have a relatively small size, are substantially, rigidly connected to the motorcycle, and have little or no effective adjustment. Of those motorcycle seats that do have spring supports, the spring supports normally have to be set for a medium person as the spring support is not effectively adjustable. Thus when a heavier person sits on the seat, the spring bottoms out on bumps or the like or when a lighter person sits on the seat, it is too rigid to provide any effective resilient support. Further such seats, when mounted on a motorcycle, and which do have some adjustment of the spring tension supporting the seat, do not have any longitudinal adjustment to adjust the position of the seat relative to the rest of the motorcycle. Further such known seats are normally constructed in a manner that makes the seats expensive to make, subject to structural failures in use, and have a size that is too small. Also such known seats in general are very poor in dampening out vibrations in use. Thus on bumpy surfaces, the vibration through the machine is often transferred directly to the rider.

Thus it is advantageous to have a new and improved motorcycle solo saddle type seat that eliminates substantially the vibration and shock to the rider from the motorcycle, that has a relatively large size with strong structural integrity for supporting the rider in comfort, and is adjustable both in position relative to the motorcycle and in the amount of resilient support provided to the seat.

SUMMARY OF THE INVENTION

In an exemplary embodiment of this invention, the seat structure has a unitary, contoured, rigid shell forming a large saddle seat shape. The shell is preferably made of fiberglass, or of other suitable, moldable materials. Embedded within the wall of the seat shell are metal plates. A foam padding is fixed to the upper surface of the seat and conforms to the shell shape with a thickness that, coupled with the spring support, substantially eliminates vibration and shock allowing the rider to remain comfortable for long durations.

A torsion spring suspension system comprises a spiral spring having elongated legs that supports the seat on a seat mounting plate. One of the legs abuts against the mounting plate and is longitudinally adjustable, and the other legs abut against a flat bottom surface of the seat shell immediately adjacent an elongated plate embedded in the seat shell. Spaced connecting means support the seat shell and embedded plate in abutting relationship to the torsion spring leg, allowing adjustment of the seat relative to the supporting spiral spring, and thus adjusting the resilient support to the rider's weight. The combination of the torsion suspension support and the foam padded seat shell, with the adjustment of the resilient support for the rider's weight, affords a ride just short of an uncomfortable "float" while insulating the rider from the bumps and holes of a road surface.

It is therefore an object of this invention to provide a new and improved solo seat for motorcycles and the like.

Other objects and many advantages of this invention will become more apparent upon a reading of the following detailed description and an examination of the drawings, wherein like reference numerals designate like parts throughout and in which, FIG. 1 is a side view of an embodiment of the invention.

FIG. 2 is a sectional view taken along line 2—2 of FIG. 1.

FIG. 3 is a sectional view taken along line 3—3 of FIG. 1.

FIG. 4 is a sectional view taken along line 4—4 of FIG. 1.

FIG. 5 is a sectional view taken along line 5—5 of FIG. 3.

Referring now to the drawings, a saddle shaped seat 10 has a unitary shell 30. Shell 30 is preferably made of fiberglass or of other suitable materials and is dish shaped to conform to the body of the rider. Foam padding such as foam rubber 36 or the like is shaped to and secured to the shell 30, such as by adhesives or the like, and an outer vinyl cover 38 is laid over and affixed to the foam padding 36 and secured around its outer edges 44 to the rim or band portion 40. Curved foam material also overlaps the rim and band portion 40 of the shell 30 to provide a padded surface 42 at the outer edge of the seat structure. Embedded in the seat shell 30 is a longitudinal steel plate 32 with a cross plate 34 welded thereto and angled upwardly to conform to the curvature of the shell. The plate 32 and the outer wall surface 48 of the shell, combine to provide a relatively flat lower surface. The seat structure 10 provides a foam cushion seat having a relatively large size, and yet of integral solid construction that reduces the transfer of vibration and shock to the rider.

The seat support comprises a torsional suspension system that comprises a spring member 22 having a spiral spring 25 with extending legs 21 and 23. Legs 21 have their flat surfaces abutting against the lower wall 48 of the seat shell 30 and are secured thereto by bolts 46 and clamp plates 50. The bolts extend through wall 48 and threadedly engage the steel plate 32.

The other legs 23 extend downwardly and abut against a seat mounting plate 14. Steel mounting plate 14 is supported at one end 20 by a suitable connection that is generally conformed to the particular motorcycle on which the seat structure is mounted. The front end of the plate 14 is secured by vertical plates 16 to a tubular member 18 that fits onto a receiving tubular member of the motorcycle structure to provide support for the seat plate 14. The legs 23 of the spring support 22 are secured to plate 14 by bolts 26 and clamp plate 27.

In operation, the seat is mounted onto the motorcycle structure as previously described. The particular rider then sits on the seat and tests the spring support provided to the seat by the torsional spring structure 22. By loosening screws 46, the seat may be slidably moved along legs 22 to a position where the seat position on lets 22 provides the desired resilient support of the rider's weight. Bolts 26 are then loosened and legs 23 slidably moved relative to plate 14 to adjust the longitudinal position of the seat relative to the motorcycle. Bolts 46 and 26 are tightened and the seat is in proper position for use. In such use, the spring not only resiliently supports the rider from major shocks received by the motorcycle, such as from bumps or holes in the road surface and the like, but also the torsional spring 22 and the padding 36 reduce the vibration and shock of the motorcycle to the rider thus allowing comfortable long duration rides.

Having described my invention, I now claim:

1. A motorcycle seat comprising, a unitary seat shell of rigid material recessed in its upper surface to provide the seat shape, the outer edges of said seat shell are curved downwardly forming an outer band surface, a layer of thick foam padding secured to and covering the upper surface of said seat shell and said band surface, a metal plate imbedded in a center portion of the wall of said seat shell forming a flat bottom surface on said shell, a rigid mounting plate for mounting said seat on a motorcycle, spring means having a coil spring with a pair of diverging legs for supporting said seat shell on said mounting plate, each of said legs having lateral spaced members, first connecting means for connecting one of said legs to said mounting plate with a major portion of the leg in substantially flat abutment against the mounting plate for providing a flat surface contact for rigid, non-vibrating support, first connecting means for connecting one of said legs to said mounting plate, second connecting means for connecting the other of said legs to said seat shell, first adjustment means for adjusting the longitudinal position of said one of said legs to said mounting plate for longitudinally positioning said seat relative to the motorcycle, and second adjustment means for adjusting the longitudinal position of said seat shell on the other of said legs for adjusting the resilient support force of said seat shell.

2. A motorcycle seat as claimed in claim 1 wherein, said first adjustment means comprising at least one clamp plate including connecting bolts for clamping said first leg between said clamp plate and said mounting plate.

3. A motorcycle seat as claimed in claim 2 wherein, in said second adjustment means, the other of said legs having an elongated flat surface with the major portion thereof abutting the flat lower surface of said seat shell, bolt means engaging said embedded plate for coacting with clamp plates for clamping said seat shell to said other legs, whereby releasing said bolt means and moving said seat shell longitudinally along the length of said other legs varies the position of said seat to said coil spring, varying the support force of said coil spring in supporting said seat shell.

* * * * *